3,458,583
METHOD OF PURIFYING ETHYLENE GLYCOL
Horst Taul, Kassel-Bettenhausen, and Hubert Kögler, Neu-Germering, near Munich, Germany, assignors to Vereinigte Glanzstoff-Fabriken AG., Wuppertal-Elberfeld, Germany
No Drawing. Filed May 6, 1966, Ser. No. 548,067
Claims priority, application Germany, May 19, 1965, V 28,502
Int. Cl. C07c 29/24
U.S. Cl. 260—637    5 Claims

ABSTRACT OF THE DISCLOSURE

Process of purifying ethylene glycol contaminated with its oxidation products by treatment with an acid-activated montmorillonite or hectorite clay at temperatures of about 70–130° C. for approximately 10 to 60 minutes and then separating the glycol from the clay by filtration. The process is useful in recovering pure ethylene glycol after polycondensation of a diglycol terephthalate.

---

This invention relates to a method of purifying ethylene glycol which is contaminated with its own oxidation products. More particularly, the invention is concerned with an improvement in the removal of such oxidation products from the glycol which is obtained during the polycondensation of a diglycol terephthalate.

Fiber-forming polyesters are produced in a well known manner, first by an ester interchange between a dialkyl terephthalate and a glycol followed by polycondensation of the resulting bis-hydroxyalkyl terephthalate at high temperatures. During this polycondensation stage, large quantities of the glycol are split off and separated as a by-product. For economical reasons, the glycol must be recovered, purified and then reused in the first ester interchange step of the overall process. With an effective purification procedure, not only are discolorations removed from the glycol but also its oxidation products such as aldehydes, hydroxy-acids and the like. Polyethylene terephthalate is the most common of the fiber-forming polyesters, although other polyalkylene terephthalates can also be made in the same manner or one can modify the polyethylene terephthalate by using relatively small amounts of glycols other than ethylene glycol and/or other dicarboxylic acids. In general, the present invention is applicable to the purification of the glycol or mixtures of glycol split off during the formation of the polyester.

The preferred method of purifying the glycol has been by distillation. However, only about 70% of the glycol can be recovered immediately in pure form, while the first and last runs of the distillation must be redistilled with accompanying large losses of glycol. A high energy cost is also required for distillation because the head temperature of the column must be at least 197° C. Furthermore, the throughput in the weight of glycol per unit time through the distillation column is very low so as to further increase the cost of the purification.

It has been suggested that the contaminated glycol be treated prior to distillation with acids such as sulfuric acid or phosphoric acid or also with zinc chloride. Another recommended procedure has been to dilute the contaminated glycol with water and with a strong mineral acid for acidification, after which the liquid is filtered, partially dehydrated, neutralized and finally distilled to recover the ethylene glycol. All of these methods still require a distillation step with the same disadvantages as outlined above.

One object of the present invention is to provide a method of purifying the glycol which has become contaminated with its oxidation products in a highly efficient and economical manner.

Another object of the invention is to purify the contaminated glycol so as to remove its oxidation products by a method which does not require a distillation step.

These and other objects and advantages of the invention will become more readily apparent upon consideration of the following detailed specification.

In accordance with the present invention, it has now been found that ethylene glycol contaminated with its oxidation products, i.e. the glycol obtained as a by-product in the poly-condensation of a diglycol terephthalate, can be purified in an improved manner by admixing the glycol with about 0.2 to 10% by weight of a finely divided or powdery acid-activated montmorillonite or hectorite clay, heating the glycol-clay mixture with agitation at a temperature of about 70–130° C. for a period of approximately 10–60 minutes, and then separating the glycol from the clay by filtration.

The clays employed for the purposes of the present invention must have the following composition:

| Montmorillonite | Percent by weight |
|---|---|
| $SiO_2$ | 50–75 |
| $Al_2O_3$ | 10–23 |
| $Fe_2O_3$ | 2–7 |
| MgO | 1–5 |
| CaO | 0.5–4 |
| $Na_2O+K_2O$ | 0.2–1.5 |
| Hectorite | |
| $SiO_2$ | 50–75 |
| $Al_2O_3$ | 0.3–1.5 |
| $Fe_2O_3$ | 0.3–2.5 |
| MgO | 10–30 |
| CaO | 0.2–5.5 |

These clays can be acid-activated in conventional manner and are readily obtainable from commercial sources. For example, specific montmorillonites and hectorites with the above-noted compositions are produced by Süd-Chemi AG of Munich, Germany, under the generic trademark "Tonsil." It is essential that the clay be activated by treatment with acid prior to its admixture with the glycol rather than using the non-activated form of the clay. The acid-activated clay is preferably used in an amount of abount 0.5 to 2% by weight, with reference to the glycol.

Particularly good results are achieved in accordance with the invention if the treatment with the acid-activated montmorillonite or hectorite is carried out under a vacuum of about 10 to 50 mm. Hg. It is also advantageous to add about 3 to 30% by weight of activated carbon, with reference to the clay, when carrying out the purification method of the invention.

Since the oligomers of the terephthalic acid diglycol ester as further impurities in the glycol are not adsorbed by the acid-activated clay and are not detrimental in the polycondensation process for producing the polyester, these oligomers can be recovered from the filtrate or are preferably returned with the otherwise purified glycol to the polycondensation process. Thus, it is preferable to filter the clay-treated glycol while still hot at a temperature sufficient to retain the oligomers in solution, e.g. above about 85° C. Any low molecular weight oligomers of diglycol terephthalate which had been split off with the glycol during polycondensation are then essentially retained with the glycol throughout the purification steps.

In general, the purification proceeds most rapidly at higher temperatures and under reduced pressure. However, good results are also achieved at the lower end of the temperature range and at normal pressure, although it is usually desirable to limit the total time of treatment to not more than about one hour. Similar variations within the scope of the invention will be readily apparent to one skilled in this art.

Although various acid-activated clays or so-called fuller's earths have been used for decolorizing fats, oils and similar products, it was surprising to find that the specific acid-activated montmorillonite or hectorite used herein would have such a beneficial effect upon the removal of oxidation products from the glycol split off during the polycondensation of a diglycol terephthalate. The aldehyde oxidation products of the glycol have been especially difficult to remove, and a distillation of the glycol was generally considered to be necessary for this purpose. Also, when using different fuller's earths under otherwise identical conditions of the present invention, it was found that such substances as iron could indeed be removed from the glycol but the glycol oxidation products such as aldehydes could not be removed and would still be extremely disturbing in the reuse of the glycol.

The results of the present invention are achieved only when treating the glycol with the acid-activated montmorillonite or hectorite as described above under the prescribed conditions of the purification treatment according to the invention.

The method of the invention is further illustrated by the following examples wherein the impure glycol was obtained as a by-product in the production of polyethylene terephthalate.

Example 1

100 grams of contaminated ethylene glycol, which contained 267 p.p.m. aldehyde, were heated to 70° C. and mixed with 2% by weight of an acid-activated finely divided montmorillonite which is marketed under the trademark "Tonsil L 80." Under agitation, the glycol-clay mixture was heated to 90–95° C. and further agitated vigorously at this temperature for another 20 minutes. The hot glycol was then separated from the clay by filtration. The purified glycol exhibited a content of 31 p.p.m. of free aldehydes.

Example 2

A purified glycol obtained in the same manner as in Example 1, but with a treatment temperature of 120° C. resulted in an aldehyde content of 5 p.p.m.

Example 3

100 grams of ethylene glycol which contained 267 p.p.m. of aldehydes were heated to about 70° C. in a three-necked flask, which was provided with an agitator and vacuum-closure and filling vents. 2% by weight of "Tonsil L 80" was added to the glycol and a vacuum applied. Under agitation and a vacuum of 18 mm. Hg, the mixture was heated to 95° C. and maintained for 20 minutes at this temperature. The glycol was then filtered hot, i.e. without cooling. In the purified glycol, no free aldehydes could be detected.

Example 4

100 grams of the glycol with the same aldehyde contamination indicated in Example 1 were preheated to 70° C. and then mixed with 2% by weight of an acid-activated hectorite in accordance with the process of the invention in order to remove aldehyde impurities.

Example 5

100 grams of ethylene glycol, which contained 267 p.p.m. aldehyde, were preheated to 70° C. as in Example 3 and then mixed with 2% by weight of an acid-activated hectorite as described in Example 4. Then the reaction vessel was evacuated to a pressure of 18 mm. Hg and heated under agitation to 100° C. After 20 minutes the glycol was filtered hot. The purified glycol contained 38 p.p.m. aldehyde.

Example 6

100 grams of ethylene glycol contaminated with 267 p.p.m. free aldehyde were treated as described in Example 1 with 0.5% by weight of "Tonsil L 80," filtered hot and retreated with 0.5% "Tonsil L 80" agitated at 95° C. for 20 minutes. After filtration, the glycol was treated again twice with each 0.5% by weight of the adsorbent clay, as described under Example 1, except that the filtration was carried out after first cooling to room temperature. The glycol thus purified exhibited an aldehyde content of 15 p.p.m., and upon cool storage no difficultly soluble oligomers separated out.

Example 7

Ethylene glycol, which contained 200 p.p.m. of free aldehyde, was treated in the same manner as Example 1 but with 0.5% by weight of acid-activated montmorillonite identified as "Tonsil Optimum." The aldehyde content was thereby reduced to 75 p.p.m.

Upon utilizing 2% by weight of "Tonsil Optimum" under otherwise similar conditions, the aldehyde content was reduced to 37 p.p.m.

Example 8

For a comparative test, contaminated glycol which contained 200 p.p.m. aldehyde was treated with 2% by weight of natural, unactivated montmorillonite, identified as "Tonsil 13," at 95° C. and for a period of 20 minutes, i.e. under the same conditions as described in Example 1. After filtration, the glycol still exhibited a content of 200 p.p.m. of free aldehyde.

Example 9

100 grams of ethylene glycol contaminated with a free aldehyde content of 267 p.p.m. were treated as described in Example 1 with 0.5% by weight of "Tonsil L 80," to which 20% by weight of activated carbon had been added. The aldehyde content of the glycol then dropped to 42 p.p.m.

As will be apparent from the foregoing examples, the method of the invention is quite effective in the removal of undesirable aldehydes from an impure glycol. Other oxidation products, which are usually also contained in the glycol in lesser amounts, are also effectively removed by this treatment with the particular acid-activated montmorillonite or hectorite. In addition, the method according to the invention makes it possible to purify large quantities of the contaminated glycol per unit time, thereby avoiding a slow distillation step. In general, the cost of purifying the glycol is greatly reduced since the purification method of the invention can be carried out at lower temperatures and the clay adsorbent is easily reactivated whenever this becomes necessary. The purified glycol, which may contain diglycol terephthalate oligomers, is thus suitable for immediately reutilization in the ester interchange step of producing the linear polyester.

The invention is hereby claimed as follows:

1. A method of purifying ethylene glycol contaminated with its oxidation products which comprises: admixing said contaminated glycol with about 0.2 to 10% by weight of a finely divided acid-activated clay consisting essentially of montmorillonite of the composition 50–75% $SiO_2$, 10–23% $Al_2O_3$, 2–7% $Fe_2O_3$, 1–5% MgO, 0.5–4%

CaO and approximately 0.2–1.5% $Na_2O+K_2O$; heating the glycol-clay mixture with agitation at a temperature of about 70° C. to 130° C. for a period of approximately 10 to 60 minutes; and separating the glycol from the clay by filtration.

2. A method as claimed in claim 1 wherein said glycol is admixed with about 0.5 to 2% by weight of said clay.

3. A method as claimed in claim 1 wherein said glycol-clay mixture is heated under a vacuum at a pressure of about 10–50 mm. Hg.

4. A method as claimed in claim 1 wherein said glycol is treated with said clay and with about 3 to 30% by weight of activated carbon with reference to the clay.

5. A method as claimed in claim 1 wherein said glycol is filtered at an elevated temperature sufficient to maintain oligomers of diglycol terephthalate in solution.

References Cited
UNITED STATES PATENTS

| | | | |
|---|---|---|---|
| 2,775,623 | 12/1956 | Bell | 260—637 |
| 2,788,373 | 4/1957 | Mills et al. | 260—637 |
| 2,857,436 | 10/1958 | Mackinder et al. | |
| 2,892,800 | 6/1959 | Taipale | 252—450 |

LEON ZITVER, Primary Examiner

J. E. EVANS, Assistant Examiner